J. Willard,
Box Opener.
No. 81,855.   Patented Sep. 1, 1868.
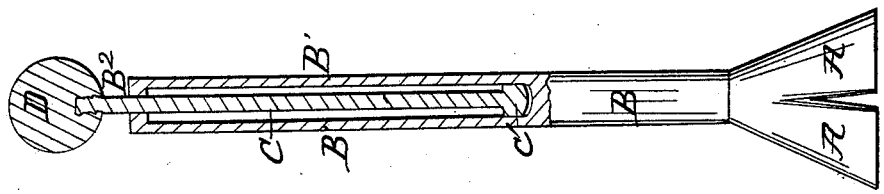
Witnesses:
Chas F. Clausen
Thos L. Baylis
Inventor:
J. M. Willard
by
D. P. Holloway & Co.

United States Patent Office.

JOHN WILLARD, OF NORWICH, CONNECTICUT.

Letters Patent No. 81,855, dated September 1, 1868.

IMPROVEMENT IN BOX-OPENERS.

*The Schedule referred to in these Letters Patent and making part of the same.*

TO ALL WHOM IT MAY CONCERN:

Be it known that I, JOHN WILLARD, of Norwich, in the county of New London, and State of Connecticut, have invented a new and useful Improvement in Chisels for Opening Boxes, and other purposes; and I do hereby declare that the following is a full, clear, and exact description of the same, reference being had to the annexed drawings, in which the chisel is shown in elevation, parts being represented in section.

My improvement, as illustrated, relates to a chisel, such as is used in opening boxes, but, by altering the form of the point, it may be applied to other uses, such as a carpenter's mortising-chisel, an engraver's chisel, cold-chisel, or other analogous uses.

The invention consists in attaching to the chisel-point a hollow stock or handle, within which a loaded plunger plays, which may be driven against the base of the socket, and used instead of a hammer in working with the chisel.

In the annexed drawing, I have shown, at A, the point of a chisel, such as is used in opening boxes. The form of the point is, however, not essential, as it may be varied to adapt it to other uses. B is the stock or handle of the chisel. The upper portion, shown in section at $B^1$, is tubular, and receives the rod C, having the head $C'$ so arranged as to rest upon the base of the socket in the handle, as shown. The rod passes through a hole in the collar or flange $B^2$, which prevents the head $C'$ from being drawn out of the socket, and directs the action of the rod in the line of the handle.

A ball or other knob, D, is fastened to the outer end of the rod C. The weight of this knob, as well as the proportions of the other parts of the chisel, must, of course, be made dependent upon the character of the work to which it is intended to apply the tool. The knob being held in one hand, the tool is to be properly directed with the other, when, by striking the head $C'$ against the bottom of the socket, the chisel will be driven as by a hammer, but always in a right line with the stock and point, and with a force capable of exact regulation.

What I claim as my invention, and desire to secure by Letters Patent, is—

The combination of the chisel-point A, the tubular handle B, and the weighted rod C, constructed and arranged to operate substantially as set forth, as an article of manufacture.

In testimony whereof, I have signed my name to this specification in the presence of two subscribing witnesses.

JOHN WILLARD.

Witnesses:
GEO. H. CARROLL,
J. S. GRANT.